(12) United States Patent
Martinez et al.

(10) Patent No.: US 11,290,527 B2
(45) Date of Patent: Mar. 29, 2022

(54) AUTOMATIC TAGGING OF CLOUD RESOURCES FOR IMPLEMENTING SECURITY POLICIES

(71) Applicant: Fortinet, Inc., Sunnyvale, CA (US)

(72) Inventors: Ignacio Franzoni Martinez, Barcelona (ES); Joan Ruiz Sanchez, Barcelona (ES)

(73) Assignee: Fortinet, Inc., Sunnyvale, CA (US)

( * ) Notice: Subject to any disclaimer, the term of this patent is extended or adjusted under 35 U.S.C. 154(b) by 86 days.

(21) Appl. No.: 16/916,237

(22) Filed: Jun. 30, 2020

(65) Prior Publication Data
US 2021/0409486 A1    Dec. 30, 2021

(51) Int. Cl.
| | |
|---|---|
| *G06F 15/16* | (2006.01) |
| *H04L 67/1001* | (2022.01) |
| *H04L 67/133* | (2022.01) |
| *H04L 29/06* | (2006.01) |
| *G06F 9/455* | (2018.01) |

(52) U.S. Cl.
CPC ...... *H04L 67/1002* (2013.01); *G06F 9/45558* (2013.01); *H04L 63/10* (2013.01); *H04L 63/205* (2013.01); *H04L 67/40* (2013.01); *G06F 2009/45587* (2013.01); *G06F 2009/45595* (2013.01)

(58) Field of Classification Search
CPC .................. H04L 63/10; H04L 63/205; G06F 2009/45587
See application file for complete search history.

(56) References Cited

U.S. PATENT DOCUMENTS

| | | | | |
|---|---|---|---|---|
| 9,934,269 | B1* | 4/2018 | Kahrs | G06F 16/9535 |
| 10,277,522 | B1* | 4/2019 | Canton | H04L 47/70 |
| 10,379,838 | B1* | 8/2019 | Chud | G06F 11/079 |
| 10,409,551 | B1* | 9/2019 | Waugh | H04W 4/12 |
| 10,417,593 | B1* | 9/2019 | Norbeck, Jr | G06F 16/3328 |
| 10,496,692 | B1* | 12/2019 | Kahrs | G06F 16/955 |
| 10,594,730 | B1* | 3/2020 | Summers | H04L 63/10 |

(Continued)

OTHER PUBLICATIONS

"Tagging Best Practices: Implement an Effective AWS Resource Tagging Strategy", Amazon Web Services, Dec. 2018, 24 pages.

(Continued)

*Primary Examiner* — Hieu T Hoang (57) ABSTRACT

Systems and methods for automatically tagging cloud resources that are spread across multiple cloud platforms are provided. According to one embodiment, information regarding each cloud provider of multiple cloud providers associated with a cloud environment used by a private network is received by a cloud-tagging orchestrator service of the private network. For each cloud resource of a plurality of cloud resources hosted by the cloud providers on behalf of the private network: (i) information associated with the cloud resource is retrieved by the cloud-tagging orchestrator service; (ii) a unified tag of multiple unified tags for the cloud resource is identified by the cloud-tagging orchestrator service based on a pre-defined global tagging policy; and (ii) the unified tag is assigned by the cloud-tagging orchestrator service to the cloud resource via an application programming interface (API) of a cloud provider of the multiple cloud providers hosting the resource.

20 Claims, 5 Drawing Sheets

(56) References Cited

U.S. PATENT DOCUMENTS

| | | | |
|---|---|---|---|
| 10,721,141 B1* | 7/2020 | Verma | G06F 11/3006 |
| 10,908,917 B1* | 2/2021 | Maislish | G06F 9/3891 |
| 2006/0026141 A1* | 2/2006 | Brubacher | G06F 9/4413 |
| 2013/0006865 A1* | 1/2013 | Spates | H04L 63/062 |
| | | | 705/50 |
| 2014/0006627 A1* | 1/2014 | Arwe | H04L 47/70 |
| | | | 709/226 |
| 2015/0350103 A1* | 12/2015 | Bertram | H04L 47/70 |
| | | | 709/226 |
| 2016/0042031 A1* | 2/2016 | Bertram | G06F 16/164 |
| | | | 707/736 |
| 2018/0123904 A1* | 5/2018 | Thakrar | H04L 41/22 |
| 2018/0234459 A1* | 8/2018 | Kung | H04L 63/0263 |
| 2018/0302275 A1* | 10/2018 | Fawcett | H04L 41/0803 |
| 2019/0149436 A1* | 5/2019 | Park | H04L 41/5054 |
| | | | 709/226 |
| 2020/0322442 A1* | 10/2020 | Luo | H04L 41/0618 |
| 2021/0064453 A1* | 3/2021 | Bahrami | G06F 9/547 |
| 2021/0176191 A1* | 6/2021 | Pargaonkar | H04L 61/30 |

OTHER PUBLICATIONS

Multi-Cloud Tagging Strategies for the Win, DivvyCloud, Oct. 14, 2019, https://divvycloud.com/tagging-strategies-importance-and-utility-of-tagging-cloud-resources/, 21 pages.

* cited by examiner

| IP Address | Cloud Services | Universal Tag |
|---|---|---|
| 192.168.1.1 | A | CDA11 |
| 192.168.1.2 | A | CDA12 |
| 192.168.2.1 | B | CDB21 |
| 192.168.3.1 | C | CDC31 |
| 192.168.3.2 | C | CDC32 |

AUTOMATIC TAGGING OF CLOUD RESOURCES FOR IMPLEMENTING SECURITY POLICIES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to the field of cybersecurity and expression of security policies with reference to tags assigned to resources. In particular, embodiments of the present invention relate to tag management and orchestration for cloud resources throughout a hybrid multi-cloud environment to facilitate real-time synchronization of such security policies implemented by the private network.

Description of the Related Art

There has been a significant increase in the use of cloud computing technology over the last few years. In a cloud environment, end-to-end automation of deployment of services is generally referred to as cloud orchestration. More specifically, cloud orchestration involves automated arrangement, coordination, and management of complex computer systems, middleware, and services, which accelerates delivery of services while reducing costs. Orchestration is used to manage cloud environments, which supply and assign cloud resources (e.g. creation of Virtual Machine (VMs), allocation of storage capacity, management of network resources, and granting access to cloud software).

While cloud platforms (e.g., Amazon Web Services (AWS), Google loud Platform (GCP) and Microsoft Azure) support the assignment of metadata to cloud resources in the form of tags (or labels) to manage, search for, and filter resources, different cloud providers may use inconsistent tag naming conventions, resulting in similar resources being tagged in a disparate manner across a multi-cloud environment and complicating definition and/or implementation of security policies.

SUMMARY

Systems and methods are described for automatically tagging cloud resources that are spread across multiple cloud platforms. According to one embodiment, information regarding each cloud provider of multiple cloud providers associated with a cloud environment used by a private network is received by a cloud-tagging orchestrator service running on a security manager associated with the private network. For each cloud resource of a plurality of cloud resources hosted by the cloud providers on behalf of the private network: (i) information associated with the cloud resource is retrieved by the cloud-tagging orchestrator service; (ii) a unified tag of multiple unified tags for the cloud resource is identified by the cloud-tagging orchestrator service based on a pre-defined global tagging policy; and (ii) the unified tag is assigned by the cloud-tagging orchestrator service to the cloud resource via an application programming interface (API) of a cloud provider of the multiple cloud providers hosting the resource.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for automatically tagging cloud resources that are spread across multiple cloud platforms. At present, cloud customers (e.g., enterprises) cloud customers experience difficulties attempting to maintain and handle tags from different cloud providers and these difficulties are compounded as their cloud deployment complexities increase. Cloud customers do not have an easy way to standardize tags across a hybrid public/private multi-cloud environment. Rather, customers must use tools and application programming interfaces (APIs) supplied by each cloud platform, which may differ significantly. The inability to implement a unified tagging approach in a hybrid public/private multi-cloud environment also affects the ability on the part of cloud customers to keep their security policies up to date.

Embodiments described herein seek to provide a global tagging orchestrator to facilitate uniform tagging of cloud resources used by enterprises that may be distributed across multiple private and public clouds of different cloud providers. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "cloud resource" generally refers to a resource or a service provided by a cloud platform on behalf of a cloud customer. A cloud resource may be allocated to a cloud customer from a shared pool of resources in physical and/or virtual form. Depending upon the cloud computing service model (e.g., Software as a Service (SaaS), Platform as a Service (PaaS), or Infrastructure as a Service (IaaS)), cloud resources may be in the form of applications (e.g., customer resource management (CRM), email, document management, collaboration, human resources, content management, sales, billing enterprise resource planning (ERP), etc. desktop), platforms (e.g., execution runtime, application deployment, database, web server, development tools, and business intelligence), and/or infrastructure (e.g., platform hosting, backup and recovery, compute resources (such as virtual machines, servers), storage resources, and network resources (such as load balancers and network security appliances/services).

As used herein, "intent-based security policy" generally refers to a security policy expressed with reference to one or more tags rather than or in addition to Internet Protocol (IP) addresses and/or virtual local area networks (VLANs).

As used herein, a "network security appliance" or a "network security device" generally refers to a device or appliance in virtual or physical form that is operable to perform one or more security functions. Some network security devices may be implemented as general-purpose computers or servers with appropriate software operable to perform the one or more security functions. Other network security devices may also include custom hardware (e.g., one or more custom Application Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

According to various aspects of the present disclosure, a centralized cloud-tagging orchestrator service running on a security manager associated with a private network receives, for example, via APIs of respective cloud platforms, information regarding cloud resources hosted by one or more cloud providers on behalf of the private network. Further, based on the received information, for each cloud resource, the cloud-tagging orchestrator service creates a tag for the resource based on a pre-defined global tagging policy that facilitates definition and enforcement of intent-based security policies, for example. The mapping of the assigned tags and the corresponding cloud resources may be maintained in a database operatively coupled with the cloud-tagging orchestrator service and the assigned tags may be pushed back out to the cloud providers periodically or on-demand. Information regarding the cloud resources may be accessed by the cloud-tagging orchestrator service using application program interfaces (APIs) provided by the respective cloud providers. As needed, the security manager (or other network security devices or management devices) may retrieve a tag from the database to apply a security policy to a corresponding resource, for example, when traffic is observed that is received from or directed to a particular cloud resource or when data associated with a particular cloud resource is accessed.

Figure 1:
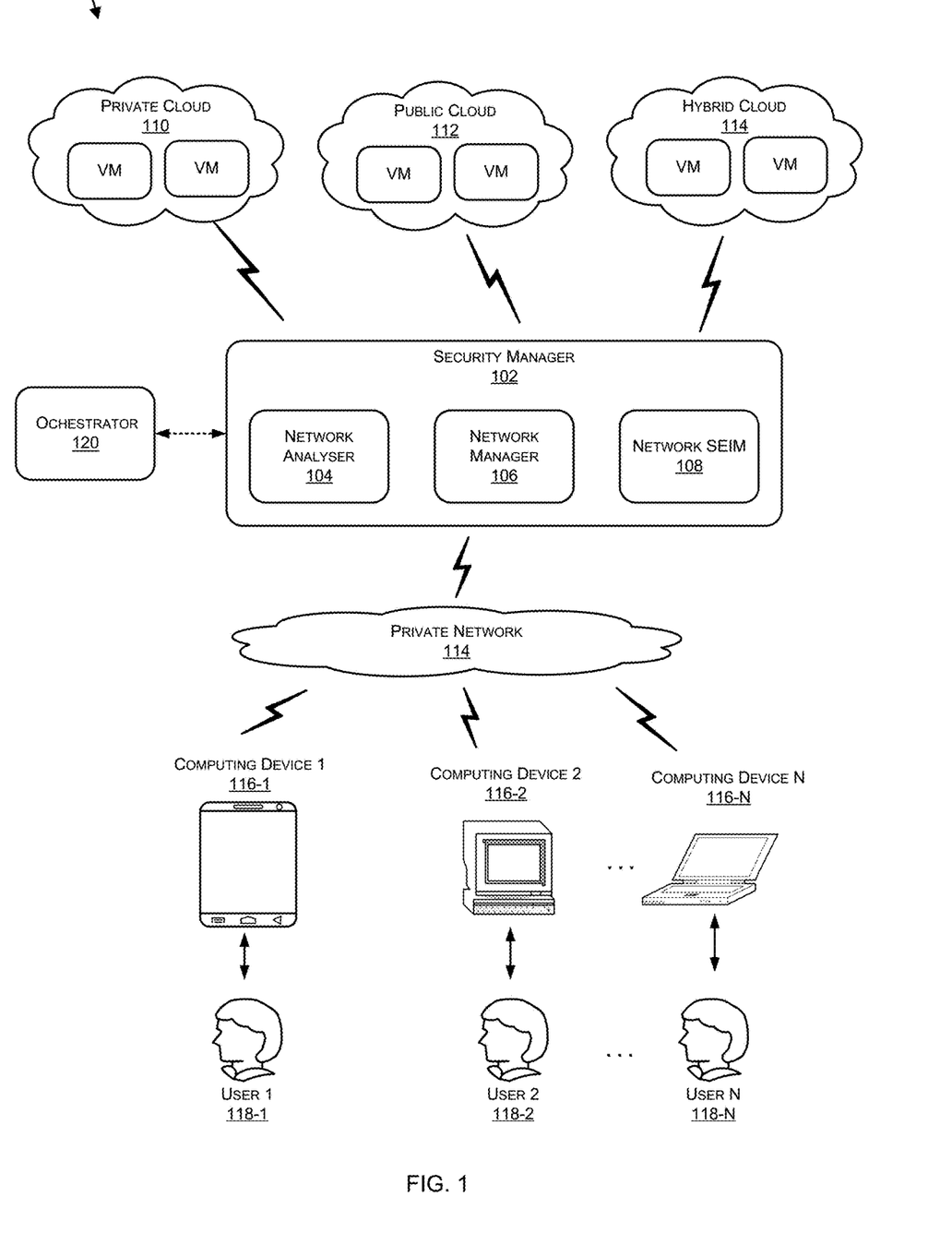
FIG. 1 illustrates a network architecture in which aspects of the present invention can be implemented in accordance with an embodiment of the present invention.

FIG. 1 illustrates a network architecture 100 in which aspects of the present invention can be implemented in accordance with an embodiment of the present invention.

In network architecture 100, a security manager 102 implementing an orchestrator 120 is illustrated. Orchestrator 120 may perform various automation tasks to reduce operational workload of configuration and troubleshooting for security manager 102. Security manager 102 is associated with a private network 114 (which may be referred to as network 114, hereinafter) and also includes or is integrated with a network analyzer 104, a network manager 106 and a network Security Information and Event Management (SIEM) appliance 108 to enable automation of security life-cycle management processes and ensure compliance. Network 114 includes computing devices 116-1, 116-2, ..., 116-N (which may be collectively referred to as computing devices 116, and may be individually referred to as computing device 116, hereinafter) that are accessed by users 118-1, 118-2, ..., 118-N (which may be collectively referred to as users 118, and may be individually referred to as a user 118, hereinafter).

In one embodiment, security manager 102 is an on-premises management appliance associated with network 114 that manages computing devices 116 associated with network 114. In another embodiment, security manager 102 is a cloud based security manager that can be implemented in the form of a cloud service (e.g., by private cloud 110, public cloud 112, and/or hybrid cloud 114). In yet another embodiment, orchestrator 120 acts as a means for communication for security manager 102 such that all cloud environments and computing devices interact with orchestrator 120 in order to interact with security manager 102. Regardless of location, security manager 102 or orchestrator 120 can maintain connectivity with each of network appliances of network 114. Non-limiting examples of a cloud-based security service include the enSilo Cloud Service and FORTIGUARD security services available from assignee of the present invention.

Computing devices 116 associated with network 114 may include, but are not limited to, personal computers, smart devices, web-enabled devices, hand-held devices, laptops, mobile devices, and the like. In one embodiment, security manager 102 may interact with users 118 through network 114 via their respective computing devices 116, for example, in the form of notifications or alerts via a user interface associated with computing devices 116.

Those skilled in the art will appreciate that, network 114 can be a wireless network, a wired network or a combination thereof that can be implemented as one of the various types of networks, such as an Intranet, a Local Area Network (LAN), a Wide Area Network (WAN), an Internet, and the like. Further, network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

As described in further detail below, orchestrator 120 may implement a cloud-tagging orchestrator service as well as manage interconnections and interactions among resources on private cloud services 110 (e.g., VMWare ESXi/NSX, OpenStack, Kubernetes or Cisco Application Centric Infrastructure (ACI)), public cloud services 112 (e.g. Amazon Web Services (AWS), Microsoft Azure, Google Cloud Platform (GCP) and Oracle) and hybrid cloud services 114. For example, orchestrator 120 may provision, deploy or start resources or virtual machines (VMs), acquire and assigns storage capacity, manage networking, create VMs, gain access to specific software on cloud services and integrate permission checks for security policy implementation and compliance.

Depending upon the particular implementation orchestrator 120 may be part of security manager 102 or may be an independent service used by security manager 102. In one embodiment, orchestrator 120 receives information regarding resources within one or more clouds (e.g., private cloud 110, public cloud 112 and/or hybrid cloud 114) that are used by an enterprise network (e.g., network 114). These clouds have ability to create and run resources (e.g., compute, storage, and/or networking resources, servers, serverless and/or other services provided by VMs) that can be accessed by orchestrator 120 using APIs provided by the respective clouds. Based on the received information, for each resource, orchestrator 120 may create a tag or a label (e.g., a character string) for the resource based on a pre-defined or configurable global tagging policy that provides intent-based resource tagging for the resources and associates the resource with the created tag by maintaining a storage database. For example, the global tagging policy may facilitate enforcement of tag policies (e.g., intent-based policies) based on one or more of the information regarding the resource, a location of the resource, and regular expressions for data associated with the resource at rest and/or in traffic. Those skilled in the art will appreciate the associated tag can be used as a global or universal tag for identification of a specific type of cloud resource or class of cloud resources regardless of the cloud provider as orchestrator 120 may push the assigned tag to the cloud service provider hosting the resource at issue. Security manager 102 may then retrieve tags from the storage database to apply appropriate security policies to the corresponding tagged resource.

In various embodiments described herein orchestrator 120 enables visibility and control of each cloud resource by the security manager 102. Embodiments of the present disclosure couple orchestrator 120 to cloud services via API and provide management, visibility, compliance and governance for cloud resources. Using direct API access, orchestrator 120 enables tag management for various resources created in public/private/hybrid cloud services. Security manager 102 may provide detailed tag analytics and management tools to ensure that tags are enforced and that resources of an enterprise are coordinated. Security manager 102 also ensures synchronization of security policy, allows security administrator to reduce complexity of security policies, and changes policy addresses for dynamic objects based on tags.

Based on the disclosure provided herein, those skilled in the art will appreciate that security manager 102 provides various features including definition, management, visibility, alerting, compliance and remediation. For example, a global tagging policy may be defined including a definition of which tags are to be associated with which resources and why such tags are to be associated with such resources.

Management features may include a single-pane of glass to provide full administration capabilities of tags and resources for all information technology (IT) systems associated with network 114. Administration capabilities may include automatic and real-time retrieval of information regarding cloud resources from multiple cloud service providers (e.g., private cloud 110, public cloud 112 and hybrid cloud 114), creating new multi-cloud tags and pushing the tags to the cloud service providers, offering an overview of tagged and untagged cloud resources used in the organization, enabling users to add global tags to the cloud resources, and enforcing tag policies based on information regarding the resource, for example, the type or nature of the resource, the location of the resource, and data associated, for example, via regular expressions for the data at rest and/or in traffic associated with the resource.

Various visibility features may enable automatic on-demand cloud resource scans and examination of existing content in one or more of multiple clouds to identify tags used and resources matching user-defined criteria. Tag usage analytics may also be provide to enable a visual summary of tag usage statistics, including trends over different time-periods as well as drilldown, resource count, and usage over time.

Alerting features may enable real-time scan searching for new cloud resources without tags and alerting of an administrator regarding existence of such new untagged cloud resources. In this manner, the administrator may be provided with an opportunity to tag such resources in a timely manner.

Compliance features may include auditing of all changes to tags at various levels of granularity, for example, at the enterprise level, by cloud, by group within the enterprise, by the user making the change, etc.

Remediation features may include automatic application of a default tag's policies on cloud resources for untagged cloud resources.

Figure 2:
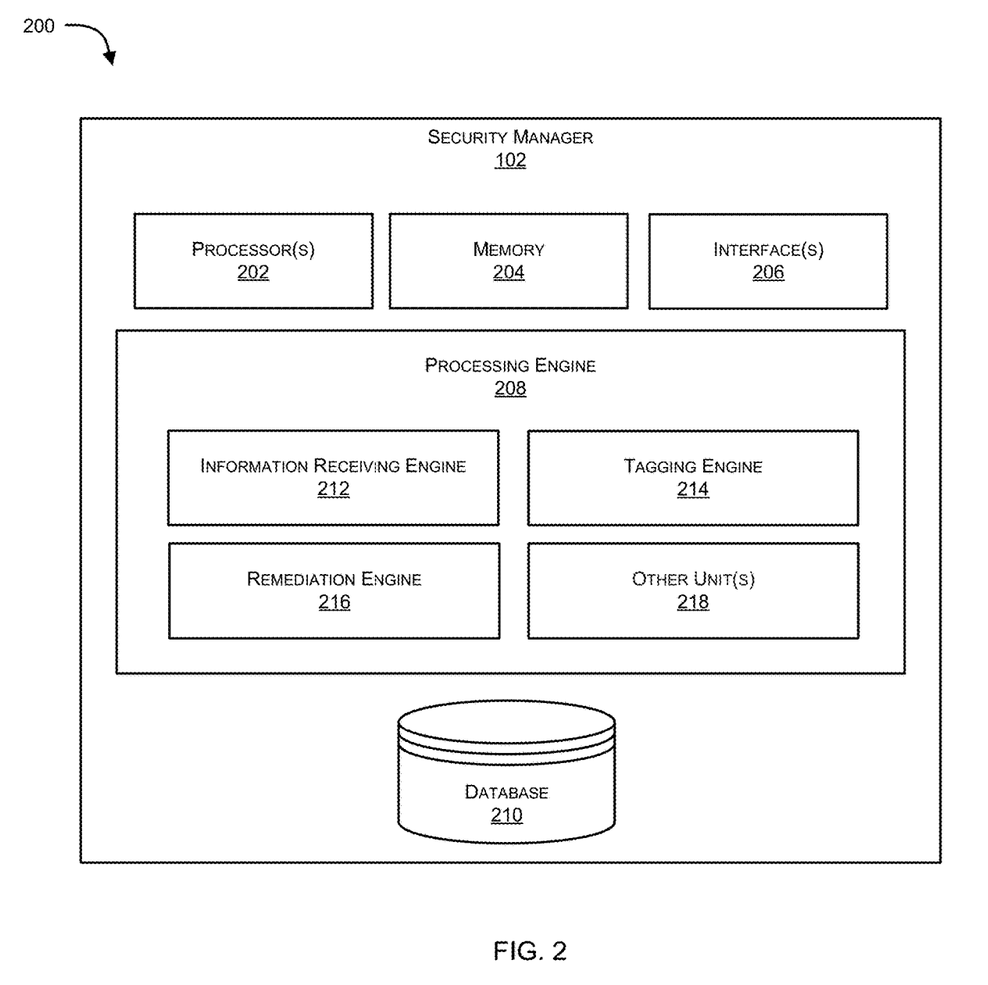
FIG. 2 is a block diagram illustrating functional components of a security manager in accordance with an embodiment of the present invention.

FIG. 2 is a block diagram 200 illustrating functional components of a security manager 102 in accordance with an embodiment of the present invention.

In the context of the present example, security manager 102 can include a processing resource in the form of one or more processor(s) 202. Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of the security manager 102. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

Security manager 102 can also include one or more Interface(s) 206. Interface(s) 206 may include a variety of interfaces, for example, interfaces for data input and output devices, referred to as I/O devices, storage devices, and the like. Interface(s) 206 may facilitate communication of security manager 102 with various devices coupled to security manager 102. Interface(s) 206 may also provide a communication pathway for one or more components of security manager 102. Examples of such components include, but are not limited to, processing engine(s) 208 and database 210.

Processing engine(s) 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) 208 may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, security manager 102 can include the machine-readable storage medium storing the instructions and the processing resource to execute the instructions, or the machine-readable storage medium may be separate but accessible to security manager 102 and the processing resource. In other examples, processing engine(s) 208 may be implemented by electronic circuitry. Database 210 can include data that is either stored or generated as a result of functionalities implemented by any of the components of processing engine(s) 208.

In an example, processing engine(s) 208 can include an information receiving engine 212, a tagging engine 214, a remediation engine 216, and other engine(s) 218. Other engine(s) 218 can implement functionalities that supplement applications or functions performed by security manager 102 or processing engine(s) 208.

According to an embodiment, information receiving engine 212 can receive information regarding cloud service e.g. public cloud, private cloud and hybrid cloud associated with network. The clouds have ability to create and run resources such as VMs that can be accessed by information receiving engine 212 using direct APIs. Based on the received information, for each resource created on each cloud service, tagging engine 214 can create a unique tag for the resource based on a pre-defined global tagging policy that provides intent based resource tagging for carious resources. In one example, the pre-defined global tagging policy can define tags based on one or more of the information regarding the resource, location of the resource, and data associated with the resource. Tagging engine 214 can also associate the resource with the created tag by maintaining a database 210. In one embodiment, tagging engine 214 can push the associated tag to cloud service provider of the resource. Further, remediation engine 216 can ensure compliance of resources with the network requirements. For example, remediation engine 216 can retrieve each tag from database 210 to apply a security policy to corresponding resource.

Figure 3A:
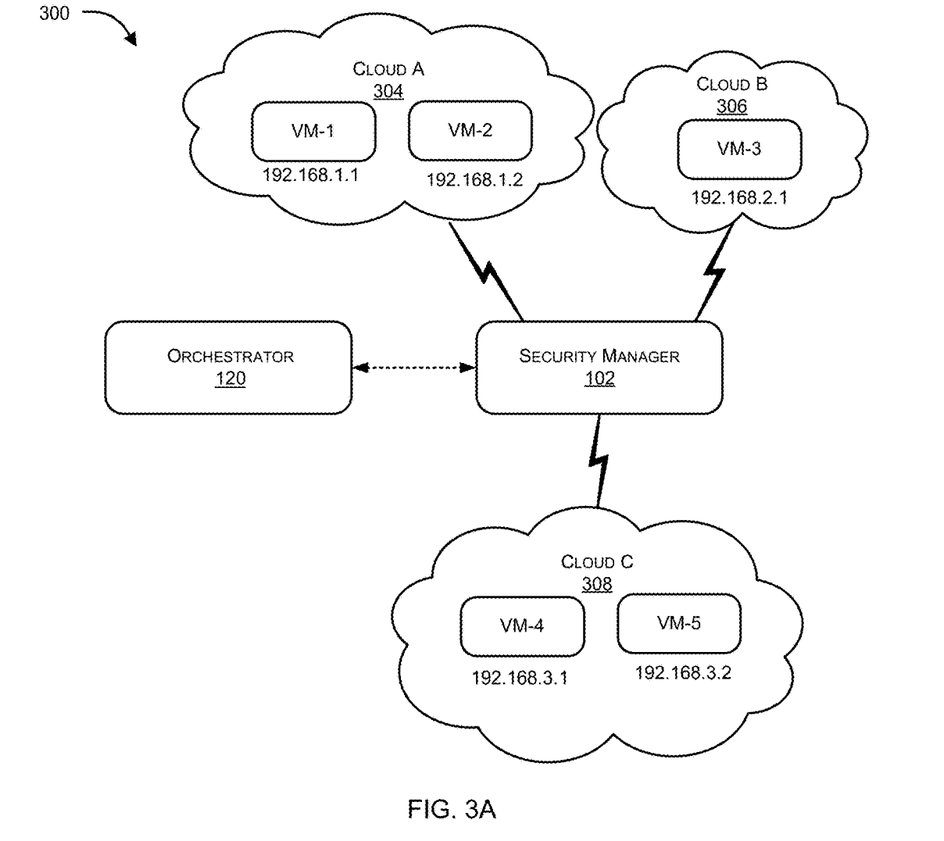
FIGS. 3A-B illustrate exemplary representations of implementation of security manager in accordance with an embodiment of the present invention.
Figure 3B:
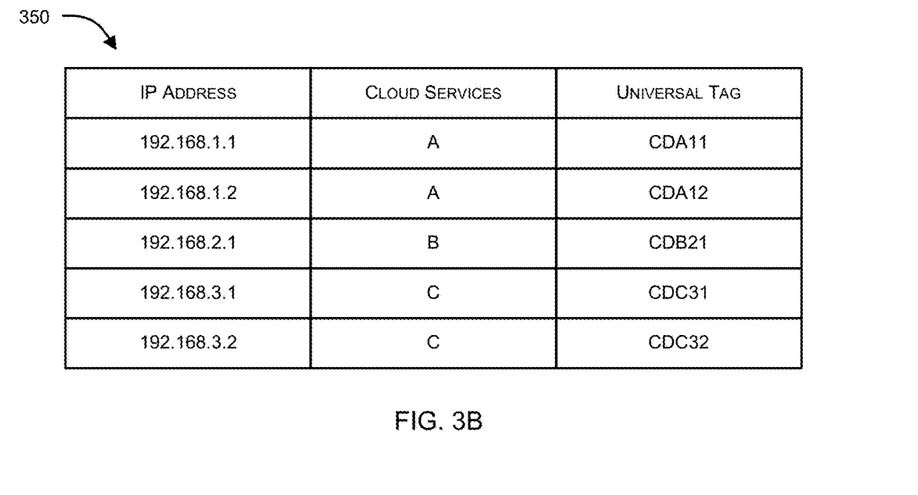

FIGS. 3A-B illustrate exemplary representations 300 and 350 of implementation of security manager 102 in accordance with an embodiment of the present invention.

In the context of architecture representation 300, security manager 102 coupled with an orchestrator 120 can be associated with three cloud providers represented by cloud A, cloud B and cloud C. Cloud A can create VM 1 with IP address as 192.168.1.1 and VM 2 with IP address as 192.168.1.2, cloud B can create VM 3 with IP address as 192.168.2.1 and cloud can create VM 4 with IP address as 192.168.3.1 and VM 5 with IP address as 192.168.3.2.

In the context of the present example, representation 350 illustrates an exemplary database maintained by orchestrator 120. As illustrated, orchestrator 120 can create a universal tag for each resource based on the cloud in which the resource is created and IP address of the resource. Mapping of the IP address and location of the resource with the created tag can be stored in the database so that the created tag can be used for the purpose of identification of the resource for implementing security policies.

Figure 4:
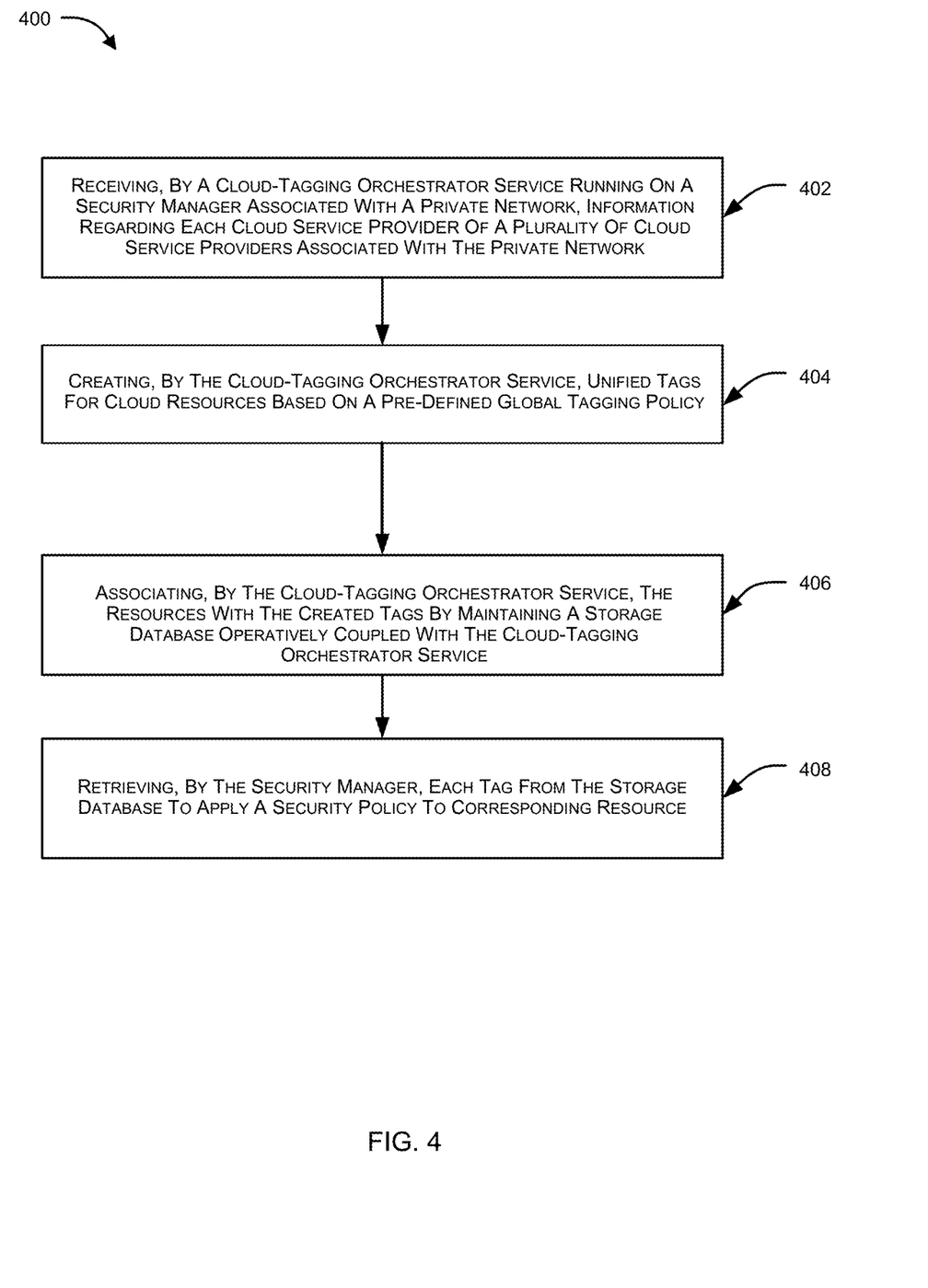
FIG. 4 is a flow diagram illustrating a process performed by a security manager in accordance with an embodiment of the present invention.

FIG. 4 is a flow diagram 400 illustrating a process performed by a security manager in accordance with an embodiment of the present invention. The processing described with reference to FIG. 4 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 500 described with reference to FIG. 5 below.

In the context of the present example, at block 402, a cloud-tagging orchestrator service running on the security manager associated with a private network receives information regarding each cloud service provider of a multiple of cloud service providers providing cloud resources on behalf of the private network.

At block 404, a unified tags are created for the cloud resources. According to one embodiment, based on the received information, for each cloud resource of the multiple cloud resources of each cloud service provider of the multiple of cloud service, the cloud-tagging orchestrator service creates a unified tag for the resource based on a pre-defined global tagging policy. For example, a customer may create multiple instances or machine instances in multiple cloud service providers for use as web servers. One cloud service provider may by default tag, label or otherwise refer to the created machine instance based on its naming convention for various classes of machine types (e.g., E2, N2, N1). Meanwhile, another cloud service provider may by default tag, label or otherwise refer to the created instance based on its naming convention for various instance types (e.g., A1, C4, C5, D2, F1, G3, G4, H1, 13, M4, M5, P2, P3, R4, R5). The global tagging policy may unify these disparate tags by mapping them to an intent-based tag (e.g., "web server").

At block 406, the resources are associated with the unified tag by maintaining a storage database coupled with the cloud-tagging orchestrator service. According to one embodiment, information regarding the various instance types and/or machine types created within the various cloud service providers used by the cloud customer is stored in the storage database. The information may include a name, an IP address, a VLAN, a function (e.g., web server, development server, etc.), the unified tag to be used across multiple clouds of a hybrid cloud environment, and the like. Furthermore, the unified tags assigned to the cloud resources may be pushed, for example, via appropriate tagging/labeling APIs, to the various cloud service providers hosting the cloud resources on behalf of the enterprise.

At block 408, when applying an intent-based security policy, for example, by a network security device (e.g., a UTM appliance of the enterprises), tags specified in a security policy may be retrieved from the storage database to facilitate application of appropriate security functions (e.g., firewalling, content filtering, traffic inspection, etc.) to network traffic associated with the cloud resource at issue.

Figure 5:
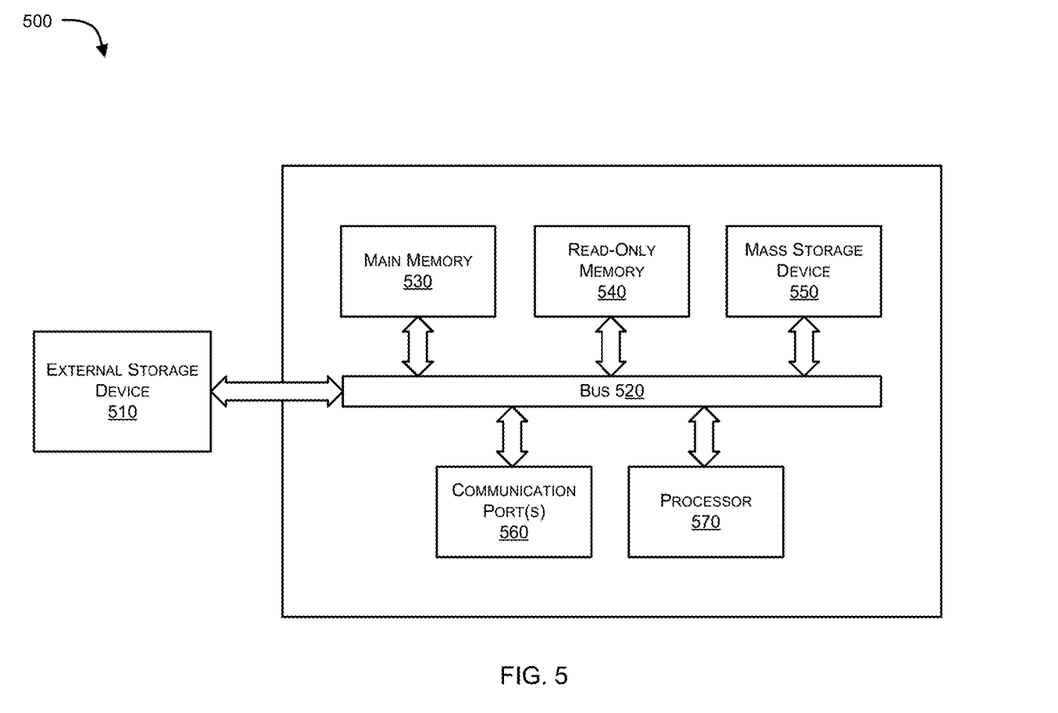
FIG. 5 illustrates an exemplary computer system in which or with which embodiments of the present invention may be utilized.

FIG. 5 illustrates an exemplary computer system 500 in which or with which embodiments of the present invention may be utilized. As shown in FIG. 5, computer system 500 includes an external storage device 510, a bus 520, a main memory 530, a read only memory 540, a mass storage device 550, a communication port 560, and a processor 570. In one embodiment, computer system 500 may represent some portion of a network device (e.g., security manager 102 or orchestrator of FIG. 1).

Those skilled in the art will appreciate that computer system 500 may include more than one processor 570 and communication ports 560. Examples of processor 570 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 570 may include various modules associated with embodiments of the present invention.

Communication port 560 can be any of an RS-232 port for use with a modem based dialup connection, a 10/100 Ethernet port, a Gigabit or 10 Gigabit port using copper or fiber, a serial port, a parallel port, or other existing or future ports. Communication port 560 may be chosen depending on a network, such a Local Area Network (LAN), Wide Area Network (WAN), or any network to which computer system connects.

Memory 530 can be Random Access Memory (RAM), or any other dynamic storage device commonly known in the art. Read only memory 540 can be any static storage device(s) e.g., but not limited to, a Programmable Read Only Memory (PROM) chips for storing static information e.g. start-up or BIOS instructions for processor 570.

Mass storage 550 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 520 communicatively couples processor(s) 570 with the other memory, storage and communication blocks. Bus 520 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 570 to software system.

Optionally, operator and administrative interfaces, e.g. a display, keyboard, and a cursor control device, may also be coupled to bus 520 to support direct operator interaction with computer system. Other operator and administrative interfaces can be provided through network connections connected through communication port 560. External storage device 510 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
   receiving, by a cloud-tagging orchestrator service running on a security manager associated with a private network, information regarding each cloud provider of a plurality of cloud providers associated with a cloud environment used by the private network; and
   based on the received information, for each cloud resource of a plurality of cloud resources hosted by the plurality of cloud providers on behalf of the private network:
      retrieving, by the cloud-tagging orchestrator service, information associated with the cloud resource;

identifying, by the cloud-tagging orchestrator service, a unified tag of a plurality of unified tags for the cloud resource based on a pre-defined global tagging policy; and assigning, by the cloud-tagging orchestrator service, the unified tag to the cloud resource via an application programming interface (API) of a cloud provider of the plurality of cloud providers hosting the resource.

2. The method of claim 1, further comprising facilitating, by the security manager, application of a security policy expressed with reference to one or more unified tags of the plurality of unified tags by retrieving information associated with a particular cloud resource of the plurality of cloud resources from a storage database.

3. The method of claim 1, wherein the cloud environment comprises a hybrid multi-cloud environment including a private cloud and a plurality of public clouds.

4. The method of claim 1, wherein said assigning further enables visibility and control for the plurality of cloud resources by the security manager.

5. The method of claim 1, wherein the pre-defined global tagging policy identifies the unified tag based on one or more of the information regarding the cloud resource, a location of the resource, and a function of the cloud resource.

6. The method of claim 1, wherein the plurality of cloud resources comprise virtual machine instances.

7. The method of claim 1, wherein the security manager comprises a cloud based security management appliance.

8. A non-transitory computer-readable storage medium embodying a set of instructions, which when executed by a processing resource of a security manager of a private network, causes the processing resource to perform a method comprising:

receiving information regarding each cloud provider of a plurality of cloud providers associated with a cloud environment used by the private network; and based on the received information, for each cloud resource of a plurality of cloud resources hosted by the plurality of cloud providers on behalf of the private network:

retrieving information associated with the cloud resource;

identifying a unified tag of a plurality of unified tags for the cloud resource based on a pre-defined global tagging policy; and assigning the unified tag to the cloud resource via an application programming interface (API) of a cloud provider of the plurality of cloud providers hosting the resource.

9. The non-transitory computer-readable storage medium of claim 8, wherein the method further comprises facilitating application of a security policy expressed with reference to one or more unified tags of the plurality of unified tags by retrieving information associated with a particular cloud resource of the plurality of cloud resources from a storage database.

10. The non-transitory computer-readable storage medium of claim 8, wherein the cloud environment comprises a hybrid multi-cloud environment including a private cloud and a plurality of public clouds.

11. The non-transitory computer-readable storage medium of claim 8, wherein said assigning further enables visibility and control for the plurality of cloud resources by the security manager.

12. The non-transitory computer-readable storage medium of claim 8, wherein the pre-defined global tagging policy identifies the unified tag based on one or more of the information regarding the cloud resource, a location of the resource, and a function of the cloud resource.

13. The non-transitory computer-readable storage medium of claim 8, wherein the plurality of cloud resources comprise virtual machine instances.

14. The non-transitory computer-readable storage medium of claim 8, wherein the security manager comprises a cloud based security management appliance.

15. A multi-tag orchestration system comprising:

a processing resource; and a non-transitory computer-readable medium, coupled to the processing resource, having stored therein instructions that when executed by the processing resource cause the processing resource to perform a method comprising:

receiving information regarding each cloud provider of a plurality of cloud providers associated with a cloud environment used by a private network; and based on the received information, for each cloud resource of a plurality of cloud resources hosted by the plurality of cloud providers on behalf of the private network:

retrieving information associated with the cloud resource;

identifying a unified tag of a plurality of unified tags for the cloud resource based on a pre-defined global tagging policy; and assigning the unified tag to the cloud resource via an application programming interface (API) of a cloud provider of the plurality of cloud providers hosting the resource.

16. The system of claim 15, wherein the method further comprises facilitating application of a security policy expressed with reference to one or more unified tags of the plurality of unified tags by retrieving information associated with a particular cloud resource of the plurality of cloud resources from a storage database.

17. The system of claim 15, wherein the cloud environment comprises a hybrid multi-cloud environment including a private cloud and a plurality of public clouds.

18. The system of claim 15, wherein said assigning enables visibility and control of the plurality of cloud resources via a single pane of glass user interface.

19. The system of claim 15, wherein the pre-defined global tagging policy identifies the unified tag based on one or more of the information regarding the cloud resource, a location of the resource, and a function of the cloud resource.

20. The system of claim 15, wherein the plurality of cloud resources comprise virtual machine instances.

* * * * *